United States Patent
Stipe

(10) Patent No.: US 7,362,533 B2
(45) Date of Patent: Apr. 22, 2008

(54) DISK DRIVE WITH SLIDER BURNISHING-ON-DEMAND

(75) Inventor: Barry Cushing Stipe, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 437 days.

(21) Appl. No.: 10/909,128

(22) Filed: Jul. 30, 2004

(65) Prior Publication Data

US 2006/0023354 A1 Feb. 2, 2006

(51) Int. Cl.
*G11B 21/02* (2006.01)

(52) U.S. Cl. ....................................................... 360/75

(58) Field of Classification Search .................... None
See application file for complete search history.

(56) References Cited

U.S. PATENT DOCUMENTS

| | | | |
|---|---|---|---|
| 5,223,996 A * | 6/1993 | Read et al. ............... | 360/97.02 |
| 5,488,524 A | 1/1996 | Cunningham | |
| 5,659,447 A | 8/1997 | Gregory et al. | |
| 5,825,591 A | 10/1998 | Nakamura et al. | |
| 5,850,317 A * | 12/1998 | Gregory et al. .......... | 360/97.01 |
| 5,991,113 A | 11/1999 | Meyer et al. | |
| 6,392,838 B1 * | 5/2002 | Hearn et al. ............. | 360/97.02 |
| 6,679,762 B2 | 1/2004 | Fatula, Jr. et al. | |
| 7,023,632 B1 * | 4/2006 | Egan et al. ..................... | 360/31 |
| 7,023,645 B1 * | 4/2006 | Emo et al. ..................... | 360/75 |
| 7,061,706 B2 * | 6/2006 | Conteras et al. .............. | 360/75 |
| 7,088,352 B2 * | 8/2006 | Wampler ..................... | 345/204 |
| 7,092,195 B1 * | 8/2006 | Liu et al. ...................... | 360/75 |
| 7,097,110 B2 * | 8/2006 | Sheperek et al. ........... | 236/1 C |
| 2002/0126416 A1 | 9/2002 | Smith | |
| 2002/0191326 A1 | 12/2002 | Xu et al. | |
| 2003/0174430 A1 | 9/2003 | Takahashi | |
| 2003/0184916 A1 | 10/2003 | Hanchi et al. | |
| 2003/0206370 A1 | 11/2003 | Zhu et al. | |

(Continued)

FOREIGN PATENT DOCUMENTS

EP 0242597 A2 10/1987

(Continued)

OTHER PUBLICATIONS

IBM, "Magnetic Head with Piezoelectric Positioning", IBM Technical Disclosure Bulletin, Oct. 1973, p. 1429.

*Primary Examiner*—K. Wong
(74) *Attorney, Agent, or Firm*—G. Marlin Knight

(57) ABSTRACT

A disk drive is described having a capability of burnishing the sliders on demand by using a heater in the slider to thermally protrude the slider. Each slider includes a heating element with a sufficient thermal expansion stroke to bring the area of the slider containing the transducer into contact with the disk surface to burnish the slider. Preferably the heater is used to bring the slider into contact with the disk to burnish the lowest flying part of the slider body after the drive has been assembled, and remove most or all of the overcoat and recession, and exposing the transducers at the ABS. The burnish process is performed in situ in the drive and the drive is preferably hermetically sealed to reduce the risk of corrosion. The slider can be flown and magnetically tested prior to burnishing off the overcoat to avoid corroding the head before the drive is assembled.

17 Claims, 7 Drawing Sheets

U.S. PATENT DOCUMENTS

2004/0021980 A1    2/2004    Albrecht et al.
2004/0029488 A1    2/2004    Smith
2005/0044696 A1*    3/2005    Fong et al. .............. 29/603.03

FOREIGN PATENT DOCUMENTS

| | | | |
|---|---|---|---|
| JP | 2054417 A1 | 2/1990 |
| JP | 4339308 A1 | 11/1992 |
| JP | 5036047 A1 | 2/1993 |
| JP | 9-293221 A1 | 11/1997 |

* cited by examiner

DISK DRIVE WITH SLIDER BURNISHING-ON-DEMAND

RELATED APPLICATION

A co-pending, commonly assigned application bearing Ser. No. 10/673,593 describing a hermetically sealed HDD enclosure which can be used in one of the embodiments of the present invention was filed on Sep. 29, 2003. This application is hereby incorporated herein by reference.

FIELD OF THE INVENTION

The invention relates to sliders used in disk drives and more particularly to methods and means for burnishing the slider in situ in a disk drive.

BACKGROUND OF THE INVENTION

Selected components of a prior art magnetic disk drive 10 are illustrated in FIG. 1. A slider 13 containing magnetic transducers 12 for reading and writing magnetic transitions is urged toward the rotating disk 16 by a suspension (not shown). As the disk rotates an air-bearing develops under the slider and causes it to fly. The slider has an overcoat 15 which provides corrosion protection for the metals in the magnetic transducers 12. The disk 16 typically includes a thin film overcoat 17 and a set of thin films 18 which include one or more ferromagnetic layers in which information is recorded. The average vertical distance between the overcoat over the magnetic read sensor and the disk surface is typically called the element fly-height (FH). Slider clearance is used to mean the amount of fly-height drop allowed before head-disk contact occurs between the lower points of the slider surface and the asperities of the disk. The magnetic spacing between the read and write elements and the disk ferromagnetic material includes two overcoats 15, 17 and the fly-height. A disk drive can contain multiple disks and multiple sliders. The slider 13 contains heater 14 which is used to affect the fly-height of the slider by causing a local thermal expansion of the slider in the area where the read and write heads are located. The thermal expansion has the effect of pushing the transducers closer to the disk and reducing the spacing between the ferromagnetic recording material in the disk and the active components in the slider. A lower slider fly-height and lower magnetic spacing is required for higher areal densities. Fly-heights of less than 7 nm are currently needed. Also the overcoats are made as thin as possible to reduce magnetic spacing. Each slider heater has an adjustable power control element (not shown) in series with it. The thermal expansion induced by a heater can be used in several ways. One use is to compensate during read operations for the similar effect which occurs during a write operation. The electrical current in the write coil causes a thermal protrusion with pushes the write head closer to the media.

Since the dimensions of magnetic sensors are currently on a nanometer scale, the surface topography has become more significant. The air-bearing surface (ABS) of the slider is typically lapped to a highly smooth surface by mechanical standards, but the resulting surface is nevertheless somewhat irregular on a nanometer scale as is suggested in FIG. 1. In addition to the roughness, the materials in the transducers 12 are typically much softer than the surrounding slider body 19 and tend to be recessed from the general plane of the ABS after slider fabrication. This recession contributes to the spacing between the magnetic sensor in the transducer and the magnetic material in the disk and is, therefore, undesirable. The slider also flies at a slight pitch angle, for example, 100 micro-radians, may have a slight roll, and the ABS may not be perfectly flat so the lowest point on the slider may not be near the transducers.

In U.S. patent application 2003/0174430 by Takahasi, et al., a disk drive with heaters in the slider is described. The heaters include a heating coil and a thermal expansion element. Two heaters are disposed on opposite sides of the transducers (heads). A temperature sensor near the heads is included. The heating coils are electrically connected through the wirings disposed in the arm assembly to a power source and the control unit. Current is supplied from the power source to the coils under control of the control unit. The control unit has a fly-height detection unit, a fly-height control unit, a power supplying control unit, and a converting unit.

U.S. patent application 20040021980 by Albrecht, et al., describes a disk drive with a self-limiting wear contact type air-bearing slider. The magnetic elements of the read/write head extend into and are surrounded by a wearable pad that protrudes beyond the air-bearing surface of the slider. The end of the protruding pad and the ends of the magnetic elements are covered by a corrosion-resistant overcoat that protects the magnetic elements during slider fabrication and disk drive assembly. The overcoated protrusion pad sliders are assembled into the disk drive in a special environment, typically air with humidity controlled below a level above which corrosion of the magnetic elements would occur. The drive is then hermetically sealed. When the slider and disk are first engaged, the disk will be rotated at a reduced RPM (or reduced atmospheric pressure) so that the pad will interfere with the disk surface, which is typically formed of amorphous carbon, and wear down to a selected level. When this level is reached, the wear will be self-limiting and not continue further because of the support provided by the ABS at the reduced disk RPM. When the wear point is reached the overcoat will be completely removed from the pad, thereby exposing the magnetic elements. This initial wear-in process takes place fairly rapidly, typically within about thirty minutes. When the disk is then rotated at full RPM during normal operation of the disk drive there will be a small, well-defined clearance between the magnetic elements and the disk. The result is a head/disk interface which is near contact or zero interference to provide a very small magnetic spacing and which can be reproduced with a wide range of manufacturing tolerances.

U.S. patent application 20040029488 by Gordon Smith describes a method of burnishing a rear pad of a slider within a disk drive. The rear pad is formed of a burnishable material and contains the transducers for reading and writing. The slider is moved in a radial fashion relative to the disk surface in a reciprocal fashion, causing the rear pad to rock. As the rear pad rocks, contact between the rear pad and the disk surface burnishes the rear pad. As a result, a positive camber is imparted in the rear pad relative to the magnetic sensor element. The method can be practiced following initial manufacture of the disk drive, or at various times over the life of the disk drive. In one embodiment, the method includes establishing a radial acceleration of the slider in the first burnishing mode of operation as greater than a radial acceleration of the slider under normal operational conditions of the disk drive. In another embodiment, the disk rotational speed is varied to further enhance burnishing.

In U.S. patent application 20030184916 by Hanchi, et al., the contact interface of the slider is textured to provide a relatively high wear rate to form a self-adjusting fly height interface. Head-disk contact between the textured slider area burnishes the surface of the slider. The burnished portion provides a profile to transition from a contact regime to a fly height regime. Typically, the slider body is formed of an $Al_2O_3$—TiC material and the transducer portion includes an $Al_2O_3$ (alumina) transducer portion encapsulating the transducer elements. The textured structure is formed on the relative soft $Al_2O_3$ portion using interference lithography techniques or laser holography to provide a desired wear rate and a self-adjusting fly height transition.

In U.S. patent application 20020126416 by Gordon Smith a combined magnetic data and burnish head for magnetic recording is described. A burnishing operation is initiated using magnetic force means in the suspension to force the slider below a normal fly-height. The rotational speed of the disk can be substantially less than the rotational speed of the disk during normal read/write operation. In one embodiment, the disk is rotated between about 2500 rpm and about 5000 rpm during the burnishing operation and at about 10,000 rpm during the normal read/write operation. During burnishing operation, the burnishing element physically contacts and removes contaminant particles and/or or other disk surface irregularities.

SUMMARY OF THE INVENTION

A disk drive is described having a capability of burnishing the sliders on demand. Each slider includes a heating element with a sufficient thermal expansion stroke to bring the area of the slider containing the transducer into contact with the disk surface to burnish the slider. Since the disk drive controls the power applied to the heater, the time of burnishing can be selected. Also, the amount of power may be selected to control the contact pressure during burnishing. Preferably the heater is used to bring the slider into contact with the disk to burnish the lowest flying part of the slider body after the drive has been assembled, and remove most or all of the overcoat and recession, and exposing the transducers at the ABS. The burnish process is performed in situ in the drive. The drive is preferably sealed hermetically to reduce the risk of corrosion after burnishing. The slider can be flown and magnetically tested prior to burnishing off the overcoat to avoid corroding the head before the drive is assembled. Using a heater to protrude the head allows burnishing without changing disk rpm or ambient pressure. Burnish times can be minimized and burnish control improved because only a very small area (the area that protrudes) comes into contact with the disk. The burnishing-on-demand of the invention can reduce magnetic spacing compared to the prior art and/or reduce the heater power and magnetic sensor temperature while the heater is on. Advantageous tradeoffs between magnetic spacing and the power/temperature budget of the heater can be made using the invention. The distribution of fly-height clearance (sigma) is reduced because a fixed power/protrusion can be used to burnish which leads to a variable amount of burnish depending on the original fly height of the heads. This variable burnishing compensates for the original variations in fly height from slider to slider by removing a variable amount of material from the slider.

DETAILED DESCRIPTION OF THE INVENTION AND THE PREFERRED EMBODIMENTS

Figure 1:
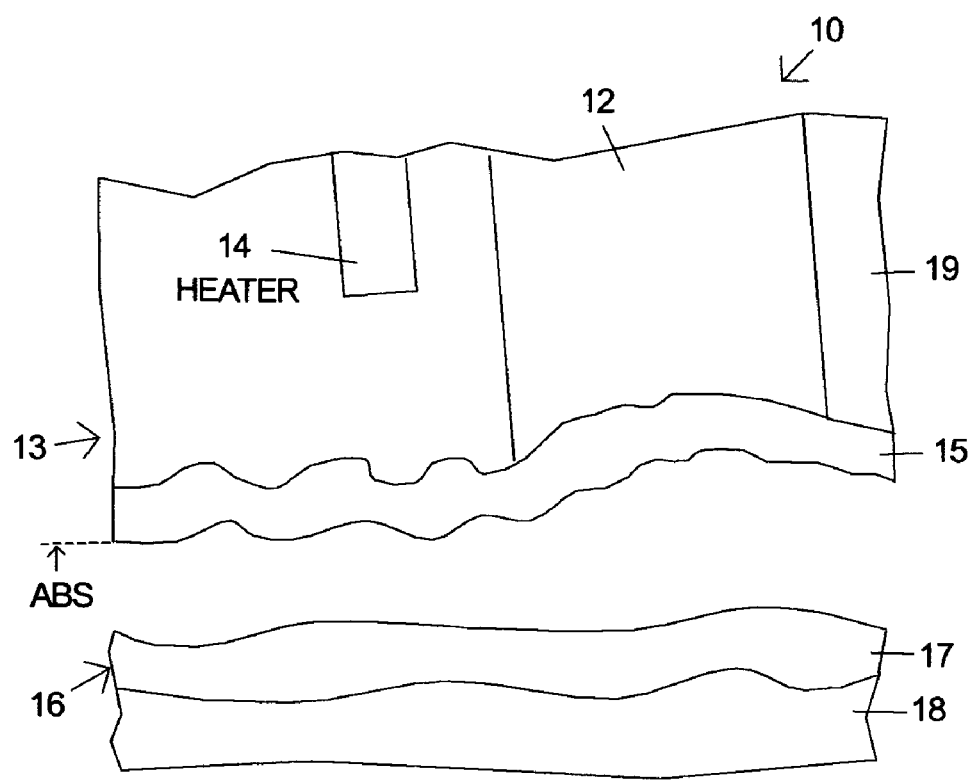
FIG. 1 is an illustration of selected components of a prior art disk drive illustrating the relationships between the slider, the heater and the disk.
Figure 2:
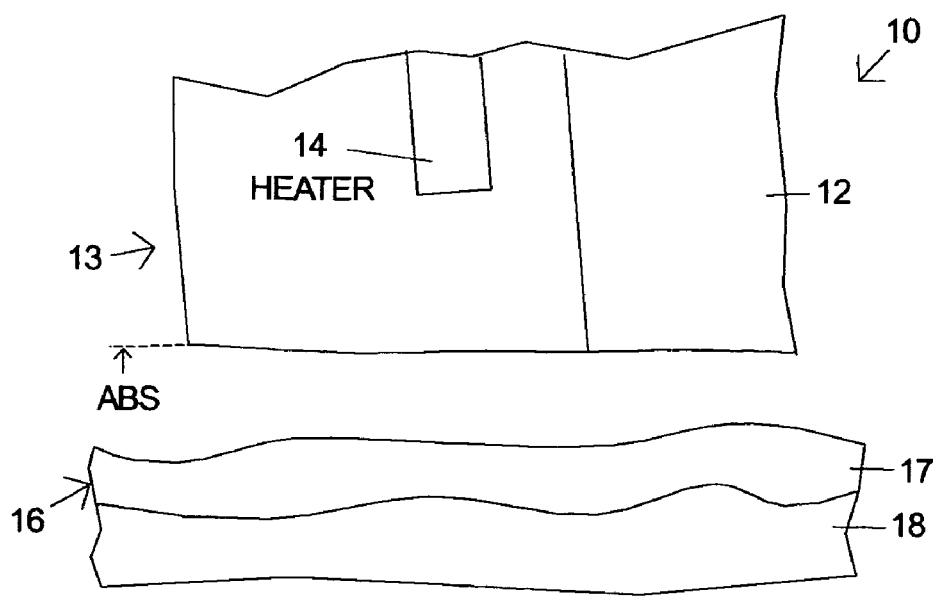
FIG. 2 is an illustration of a disk drive with according to an embodiment of the invention after burnishing.

A disk drive according to the invention includes a control system which executes a burnishing operation under firmware control. A disk drive typically includes one or more sliders. A slider according to the invention includes a heat source near the read sensor which has the capacity to protrude the surface of the slider by an amount sufficient to cause contact with the disk while the disk is rotating. Unlike some other burnishing methods, the invention does not require reduced rpm and can achieve burnishing at the normal rotation speed. The heater can be a separate element 14 in the slider as shown in FIG. 2, but it is also possible to use the write coil for the heating. In the following the term heater will be used to refer interchangeably to either a separate heater or the write coil used as a heater.

FIG. 2 illustrates a disk drive 10 according to the invention after the burnishing has been performed. The slider 13 has been burnished against the disk 16 by supplying sufficient power to heater 14 to cause a thermal protrusion of the slider. The burnishing has been continued long enough to remove all of the overcoat and the recession have been removed. The resulting ABS is smoother and more parallel to the disk surface than prior to burnishing. Although the burnishing process of the invention can be performed when conventional hard materials are used such as diamond-likecarbon (DLC) for the overcoat and $Al_2O_3$—TiC or other ceramic for the slider body, softer materials or structures can be used as well.

Figure 12:
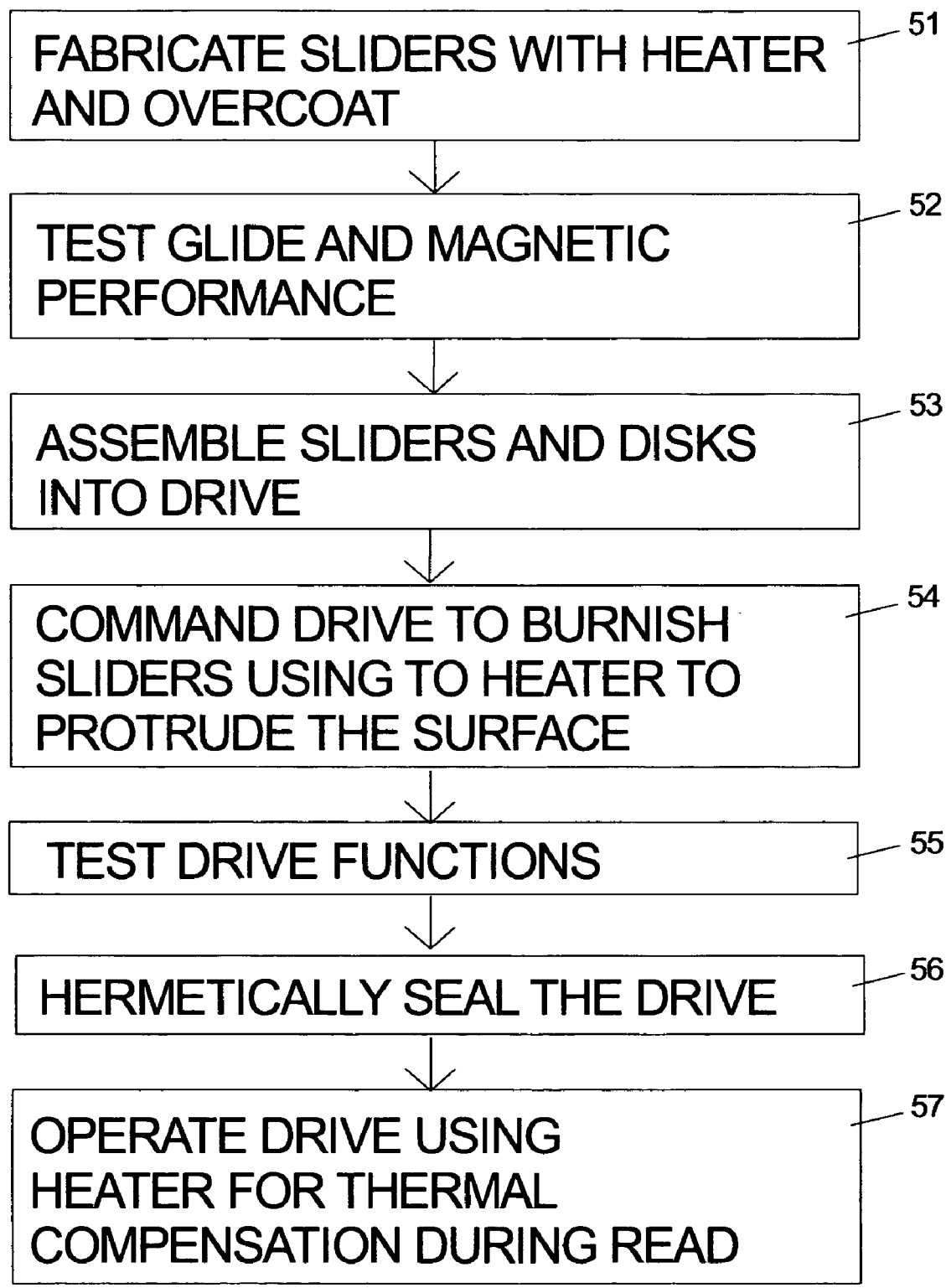
FIG. 12 is a flow chart of a method of manufacturing disk drives according to the invention.

FIG. 12 is a flow chart of a method of manufacturing disk drives according to the invention. The sliders are fabricated with a heater and preferably with a protective overcoat as in the prior art 51. The conventional glide and magnetic testing is optionally performed as in the prior art 52. The sliders and disk are installed into the disk drive 53. The burnishing process is executed by the drive control system using a selected power level to the heater 54. Drive-level testing is conducted 55. The disk drive is preferably hermetically sealed 56 after the burnishing and subsequent testing since the cost of sealing is relatively high and can be saved if the disk drive is already malfunctioning. The process can be initiated by prior art means used to initiate disk drive activity under control of the firmware, for example, by command from host computer. The normal operation of the disk drive for further testing and use is preferably performed using the heater for thermal protrusion compensation during read operations 57. Assuming the same environmental conditions, the power level for normal operation will preferably be less than the burnishing power level. To provide slider clearance during normal operation the protrusion during burnishing is larger than the protrusion during normal operation.

Figure 3:
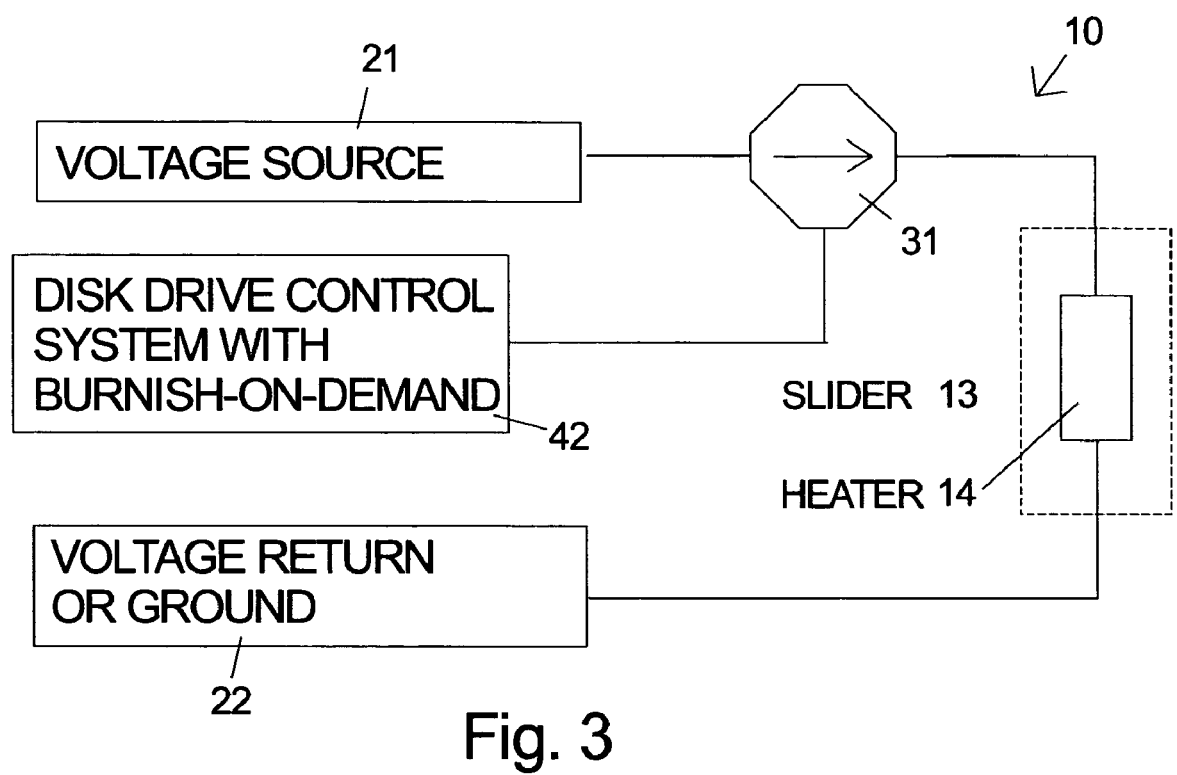
FIG. 3 is an illustration of a disk drive with according to an embodiment of the invention with burnishing controlled by the disk drive control system.

In FIG. 3 disk drive 10 includes disk drive control system 42 which includes microprocessors and firmware (not shown). The drive control system 42 controls the amount of power to heater 14 by signaling programmable power control element 31 which can be a voltage or current control device. The voltage source 21 can be the conventional power supply voltage in disk drives. The circuit through the heater 14 is completed through the voltage return (for example, a negative voltage) or ground 22. Prior art drive control systems execute many control functions automatically, but also include means for accepting commands from a host computer including commands related to testing, calibration and power management. The burnish-on-demand of the invention is preferably integrated into the overall drive control system, so that a command from the host computer or test station can invoke the burnishing process.

Figure 4:
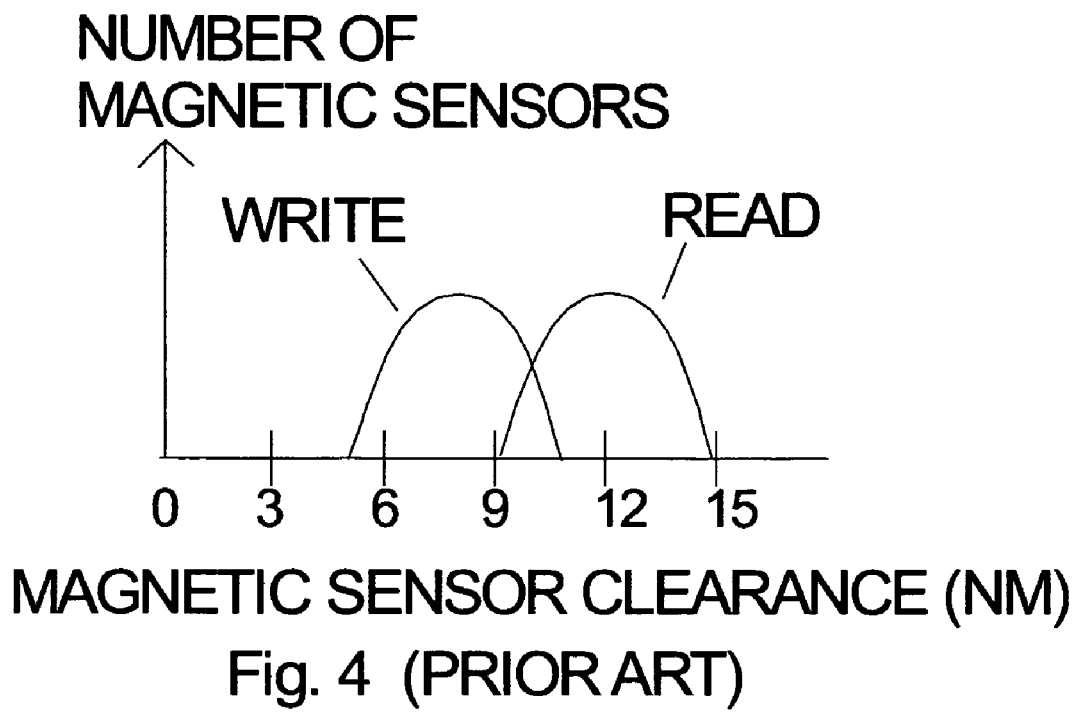
FIG. 4 is a graph of magnetic sensor clearance distributions for a typical set of prior art sliders subject to write protrusion effects without compensation according to a first example.

To illustrate the advantages of the invention graphs comparing magnetic sensor clearance for various heads will be described. Sensor clearance refers to the drop in magnetic spacing required to bring the lowest part of the active sensor material into contact with the disk asperities. FIG. 4 is a graph of magnetic sensor clearance distributions for a typical set of prior art sliders subject to write protrusion effects without compensation. In FIG. 3, it is assumed that the combined head carbon thickness and magnetic sensor recession is 3 nm, the minimum slider clearance for long-term reliability is 2 nm, the fly-height three-sigma is 3 nm, and the write protrusion is 4 nm. The sigma is assumed to include the effects of slider, suspension, and other variations. Fluctuating environmental conditions such as temperature, pressure, and the slider disk-radius position are assumed fixed for illustration. For the conventional slider, the maximum magnetic sensor clearance above the disk is therefore 15 nm. The write protrusion has the effect of pushing the magnetic sensor 4 nm closer to the disk when the write coil is heating the slider.

Figure 5:
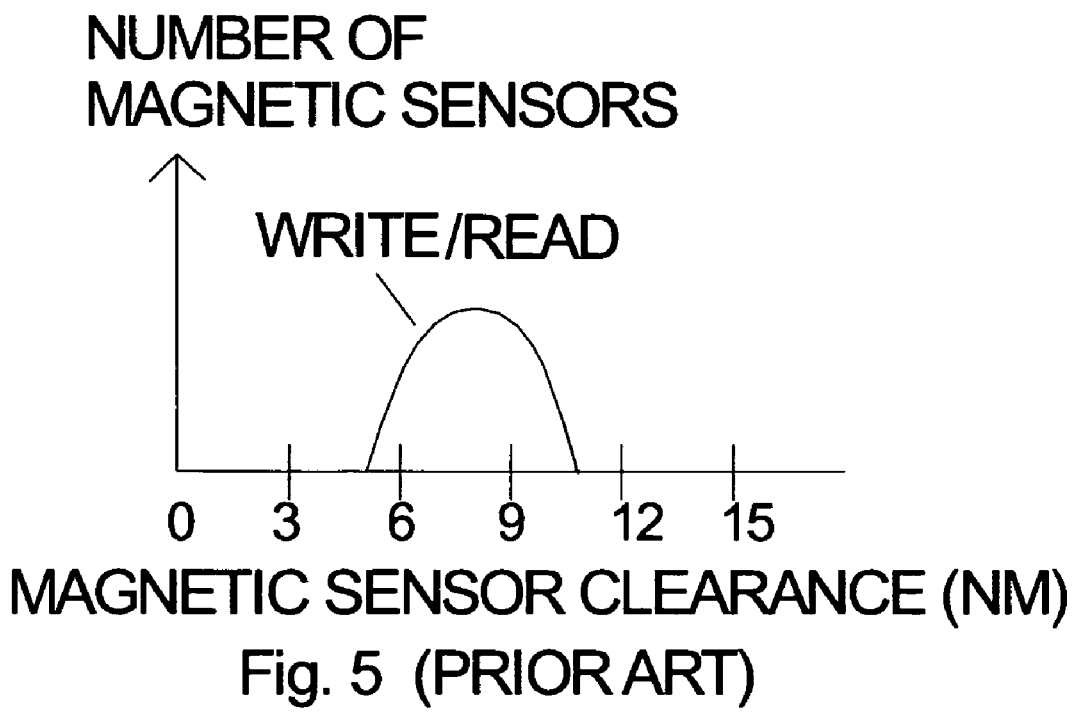
FIG. 5 is a graph of magnetic sensor clearance distributions for a typical set of prior art sliders subject to write protrusion effects with compensation according to a first example.

In the FIG. 5 a population of sliders is considered with thermal protrusion compensation (TPC). In these drives, a heater is used to compensate for write protrusion which results in the read and write population distributions coinciding. The heater in this case is used to protrude the slider 4 nm during a read operation. This brings the worst case magnetic sensor clearance to 11 nm.

In disk drive according to the invention, the heater is designed to have a greater capacity to protrude the slider, that is, has a longer stroke, than is produced by the write head during a normal write operation. The lowest flying slider in the population is designed to just clear the disk with the heater off. The heater is designed to protrude the head by a selected amount, for example, 6 nm, which will bring the entire population of sliders into contact with the disk. Burnishing is accomplished under the control of the firmware in the disk drive control system by supplying power to the heater to protrude the head by the selected amount while rotating the disk. The length of time required for burnishing to the desired level can be determined empirically depending on the specifics of the design, materials, etc. The length of time may be selected to be long enough that the wear rate drops to a very low value. In this case the total amount of wear is self-limiting as the slider begins to fly and just clears the disk. The specific parameters for the burnishing process can be established by experiment and then applied to all disk drives without the need to adjust the parameters for each slider. The burnishing according to the invention provides an inherent self-adjustment to some extent for each slider and disk combination. Since the slider is burnished to just clear the irregularities of the disk surface, each slider and disk combination is more closely matched than is the case when randomly varying parts are combined without in situ burnishing. The distribution of fly-height clearance (sigma) is reduced because a fixed parameters (heater power, duration, rotation rate, etc.) can be used to burnish which leads to a variable amount of material being burnished off as a result of the variations in the sliders and disk. This variable burnishing compensates for the original variations in fly height from slider to slider by removing a variable amount of material from the slider. The result is reduced variations in the slider and disk interface, lower sigma of clearance and improved magnetic performance.

Figure 6:
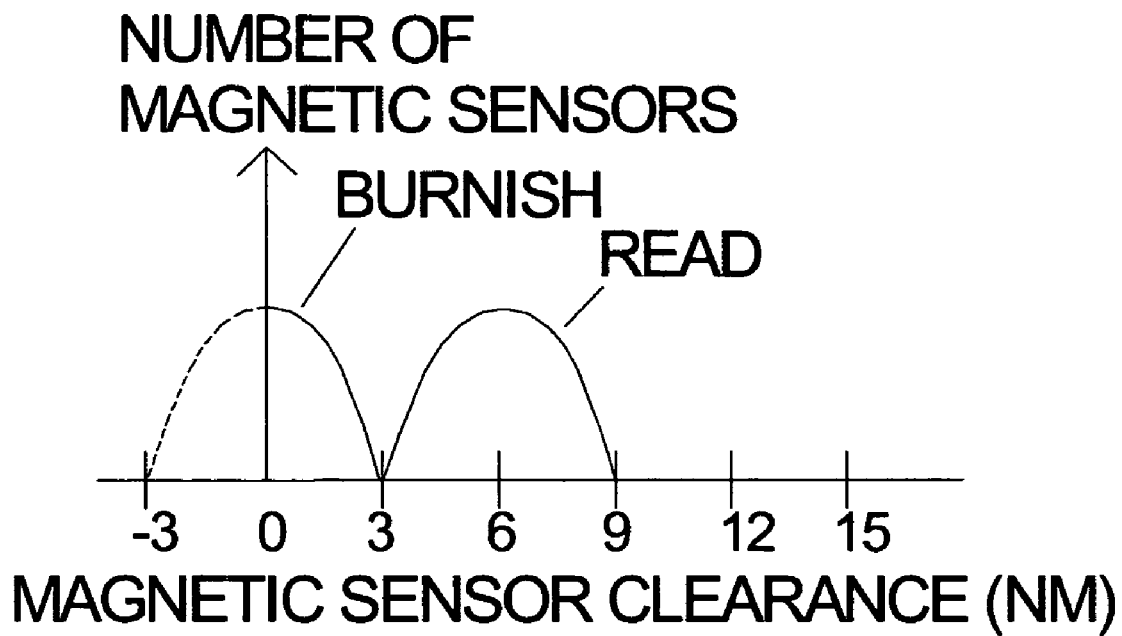
FIG. 6 is a graph of magnetic sensor clearance distributions for a set of sliders according to a first embodiment of the invention after burnishing with the heater on at the burnish power level.
Figure 7:
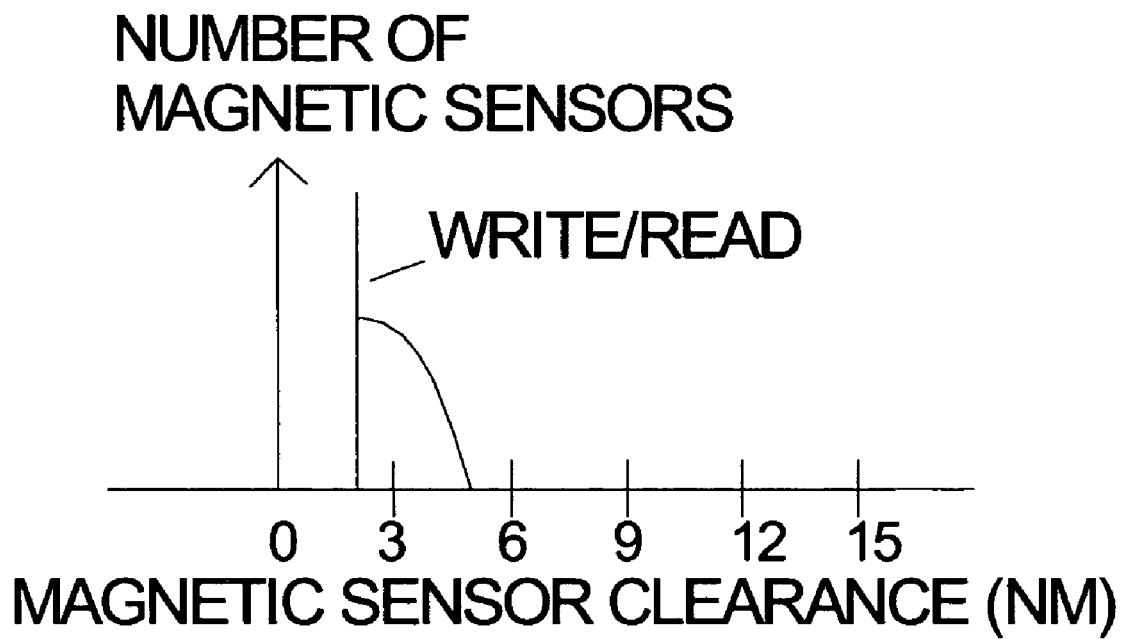
FIG. 7 is a graph of magnetic sensor clearance distributions for a set of sliders according to a second embodiment of the invention after burnishing with the heater on at the write compensation power level.
Figure 8:
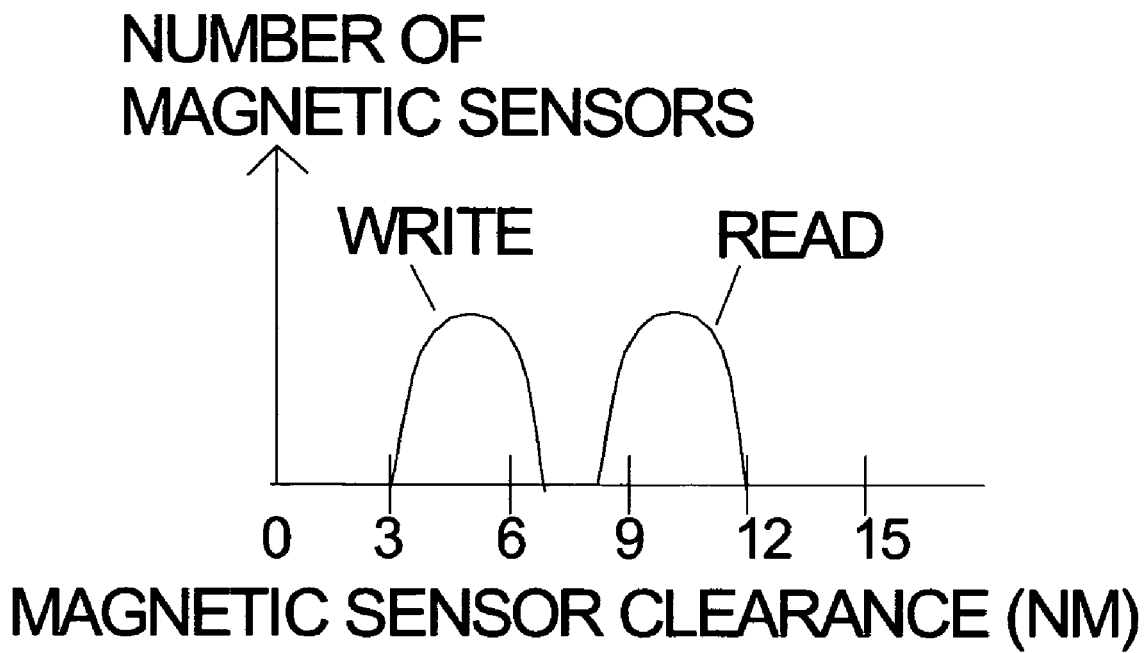
FIG. 8 is a graph of magnetic sensor clearance distributions for a typical set of prior art sliders subject to write protrusion effects without compensation according to a second example.
Figure 9:
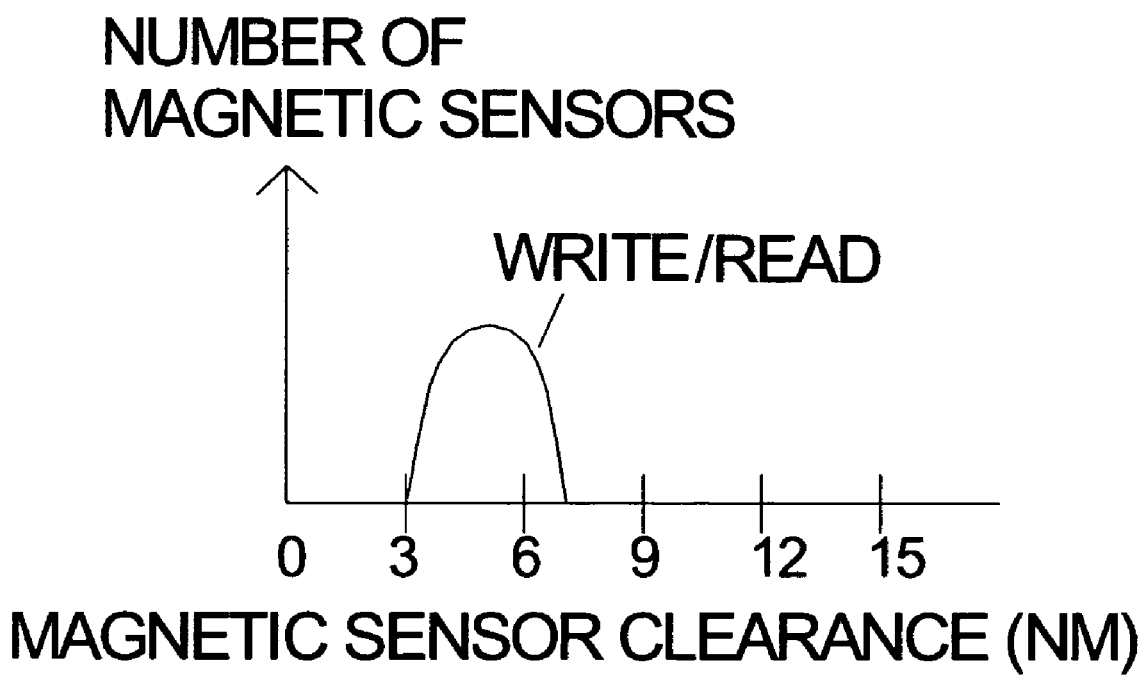
FIG. 9 is a graph of magnetic sensor clearance distributions for a typical set of prior art sliders subject to write protrusion effects with compensation according to a second example.
Figure 10:
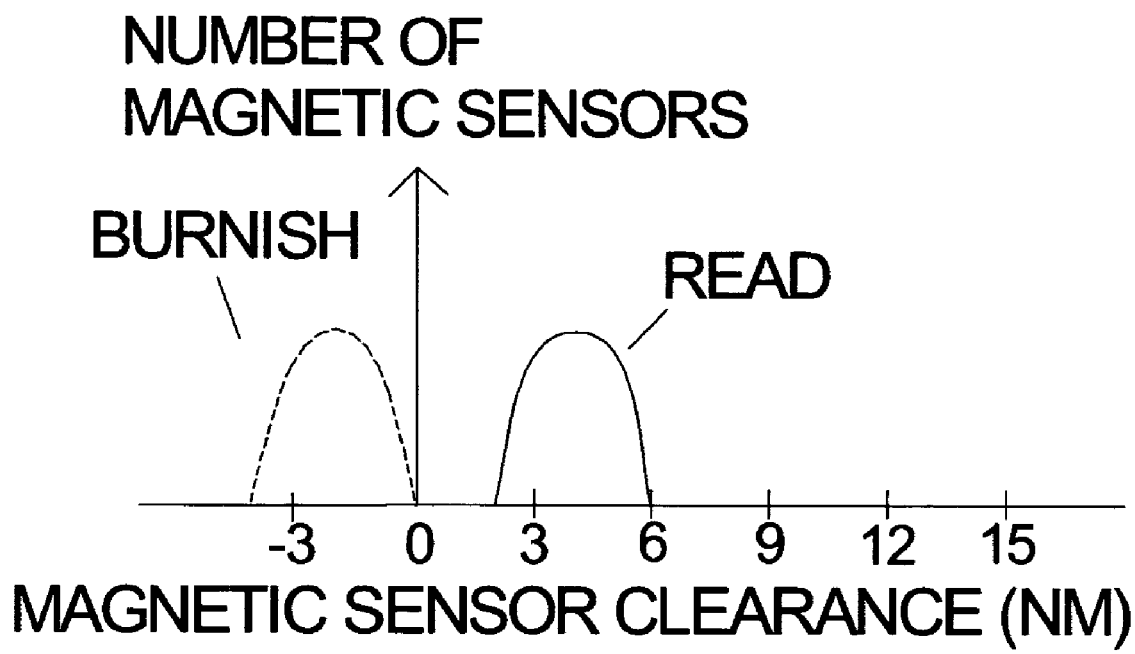
FIG. 10 is a graph of magnetic sensor clearance distributions for a set of sliders according to a second embodiment of the invention after burnishing with the heater on at the burnish power level.

In the example shown in FIG. 6, the burnishing power, rotation rate and time are selected so that statistically half of the heads are burnished all the way to the magnetic sensor. When burnishing is initiated the sliders are driven to contact the disk surface over a certain range of topography. This is illustrated by the dotted line on the graph extending from the 0 clearance to −3 nm clearance points. As material is worn away the sliders are still in contact with the disk for a certain range of topography. The duration of the burnishing for a population of sliders in this example is continued until statistically, half of the sliders have a thinned overcoat, for example, 0-2 nm of carbon remaining while half would have no overcoat left. FIG. 7 shows the graph of magnetic sensor clearance for the burnished sliders according to this example during normal use. The sliders include TPC, therefore, the read and write operations have approximately equal thermal protrusions of 4 nm. The burnishing has on average removed the 2 nm of the overcoat and the 1 nm of recession. The magnetic sensor clearance for the upper half the population has shifted downward by 4 nm and the lower half of the population are grouped at 2 nm.

Figure 11:
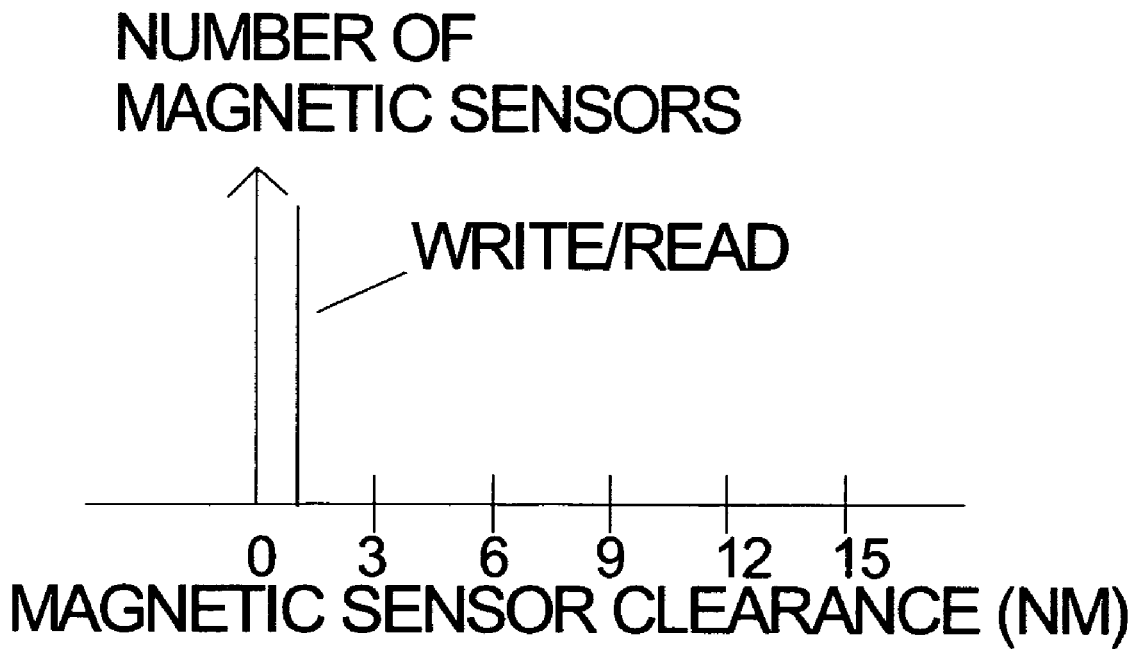
FIG. 11 is a graph of magnetic sensor clearance distributions for a set of sliders according to a second embodiment of the invention after burnishing with the heater on at the write compensation power level.

The maximum magnetic sensor clearance is now only 5 nm compared to 15 nm for the conventional slider of FIG. 4 and 11 nm for the TPC slider of FIG. 5. The maximum heater power during normal read operations is limited due to the signal degradation that occurs when the magnetic sensor temperature increases, but for burnishing read operations are not needed, so higher power is feasible.

In FIGS. 8-11, a second example of an embodiment of the invention is illustrated. In this design the carbon overcoat plus magnetic sensor recession is 2 nm, the minimum reliable slider clearance is 1 nm, the three-sigma fly-height is 2 nm, and the normal writer and heater stroke is 5 nm. The higher power heater stroke is again 6 nm. In this case, the conventional slider in FIG. 8, the TPC slider in FIG. 9, and completed burnish-on-demand slider FIG. 11 have a maximum magnetic sensor clearance of 12 nm, 7 nm and 1 nm respectively. The burnishing process is continued in this example to statistically result in the overcoat and recession being completely removed from the population of sliders. Notice that the sharp distribution at 1 nm clearance is due to the variable degree of burnish with initially high flying sliders burnished less than the initially low flying sliders. This is advantageous because fly-height sigma is reduced without having to increase heater power for the high-flying sliders. This in turn reduces the maximum head temperature and reduces the power budget of the heater. Also, fluctuating environmental conditions such as temperature, pressure, altitude, or slider disk-radius position can be compensated by adjusting the heater power. Hermetic sealing eliminates altitude sensitivity so in this case a pressure sensor is not needed. A drive temperature sensor can be used and the effect of pressure or "static protrusion" variations due to HDD operating temperature compensated with the heater (with a slightly increased power budget). Of course the sharp distribution shown in FIG. 11 for illustration purposes will not be perfectly sharp due to small variations in the burnishing process. It should also be noted that static protrusion, pressure, and slider radial position can affect slider pitch, roll, and ABS shape so that the sensor is not at the lowest point on the ABS surface. However these effects are small and can be reduced by shrinking the size of the burnish pad containing the sensor and by optimizing the environmental conditions used during burnishing. Therefore, the combination of burnish-on-demand slider and hermetic sealing can be used to achieve a low-flying slider design with a very small and precise magnetic sensor to disk clearance which is precisely set through burnishing during manufacture and dynamically adjusted during use as the temperature and slider radial position over the disk changes. By reducing magnetic spacing, the burnish-on-demand concept can be used for ultra-high areal density recording at up to 1 Terabit-per-square-inch and beyond.

The specific level of power that will be required to achieve burnishing is affected by a variety of conditions existing at the time including ambient temperature and pressure. The operating conditions for the drive can be significantly more extreme, so the amount of power required for the heater in the field during readback could conceivably be greater than was needed for burnishing in the well-controlled manufacturing environment. If the heater is used for temperature compensation, pressure compensation, slider linear velocity (disk radius) compensation, etc., these adjustments could require greater power than the power used to burnish. However, given a set of environmental conditions at the time of burnishing, the protrusion during burnish is larger than the protrusion caused by the write coils. This is to insure that enough slider material is burnished so that head disk contact does not occur when the writer is used.

In a particular embodiment of the present invention, the disk drive is hermetically sealed in a low-humidity, low-density gas environment after the burnishing is executed. Low humidity prevents corrosion of the exposed sensor material while optional low density gas improves the HDD mechanical performance. A hermetically sealed enclosure includes a metal housing with a thin metal cover and a multi-pin feed-through for passing signals to and from the mechanism sealed therein. After the HDD components are placed into the metal housing, a low-density gas, such as helium, hydrogen, methane or sub-ambient pressure air, is hermetically sealed in the metal housing.

The invention has been described with respect to particular embodiments, but other uses and applications for the techniques according to the invention will be apparent to those skilled in the art.

The invention claimed is:

1. A disk drive comprising:
a slider with at least one heater in an electrical circuit, the heater being disposed to heat an area of the slider containing a read sensor;
an adjustable power control device in the electrical circuit connected to supply variable power to the heater; and
a control system which controls the adjustable power control device to induce a variable protrusion of the slider, the control system including a burnishing procedure which applies power to the heater to protrude the slider to force the slider into contact with the disk surface while rotating the disk to burnish the slider by removing at least a portion of material from the slider and applies power to the heater for thermal compensation during read operations.

2. The disk drive of claim 1 wherein the control system executes the burnishing procedure upon receiving a command from a host computer.

3. The disk drive of claim 1 wherein the burnishing procedure removes an overcoat from the read sensor.

4. The disk drive of claim 1 wherein the disk drive is hermetically sealed.

5. The disk drive of claim 1 wherein the slider clearance is increased by the burnishing procedure.

6. A method of manufacturing a disk drive comprising the steps of:
assembling at least one slider into a disk drive, the slider including at least one heater in an electrical circuit, the heater being disposed to heat an area of the slider containing a read sensor;
rotating a disk under the slider;
burnishing the slider to remove at least a portion of material from the slider to smooth a surface of the slider containing the read sensor by applying power to the heater while the disk is rotating to protrude the area of the slider to force the slider into contact with the disk surface; and
operating the disk drive to perform read operations using the heater to protrude the area of the slider containing a read sensor to compensate for thermal protrusion caused by a write head.

7. The method of claim 6 wherein the step of burnishing the slider further comprises removing an overcoat from the slider to expose the read sensor.

8. The method of claim 6 further comprising the step of sending a command from a host computer to the disk drive to initiate the burnishing.

9. The method of claim 6 further comprising the step of glide testing the slider prior to assembling the slider into the disk drive and wherein the slider has an overcoat during the glide testing.

10. The method of claim 6 further comprising the step of hermetically sealing the disk drive after burnishing has been completed.

11. A method of manufacturing a set of disk drives comprising the steps of:

assembling at least one slider from a set of sliders into each disk drive in the set of disk drives, each slider including at least one heater in an electrical circuit, the heater being disposed to heat an area of the slider containing a read sensor and a write head in addition to the heater, the set of sliders having a first clearance distribution when positioned over a rotating disk;

rotating each disk under each slider; and burnishing each slider to remove at least a portion of material from the slider to lower the clearance distribution for the set of sliders by applying power to the heater while the disk is rotating to protrude an area of each slider to force the slider into contact with the disk surface.

12. The method of claim 11 wherein the burnishing each slider is performed using a fixed set of parameters including power level, duration and rotation rate which results in a variable amount of material being burnished from the slider.

13. The method of claim 11 further comprising the step of operating the disk drive to perform read operations using the heater to compensate for thermal protrusion caused by a write head after burnishing has been completed.

14. The method of claim 11 wherein the step of burnishing each slider further comprises timing the burnishing to completely remove an overcoat from a selected percentage of the sliders to expose the read sensor.

15. The method of claim 11 further comprising the step of sending a command from a host computer to each disk drive to initiate the burnishing.

16. The method of claim 11 further comprising the step of glide testing each slider prior to assembling the slider into the disk drive and wherein the slider has an overcoat during the glide testing.

17. The method of claim 11 further comprising the step of hermetically sealing each disk drive after burnishing has been completed.

* * * * *